April 13, 1937.  W. H. HONISS  2,077,148
GLASS FEEDING METHOD AND APPARATUS
Filed Sept. 17, 1932
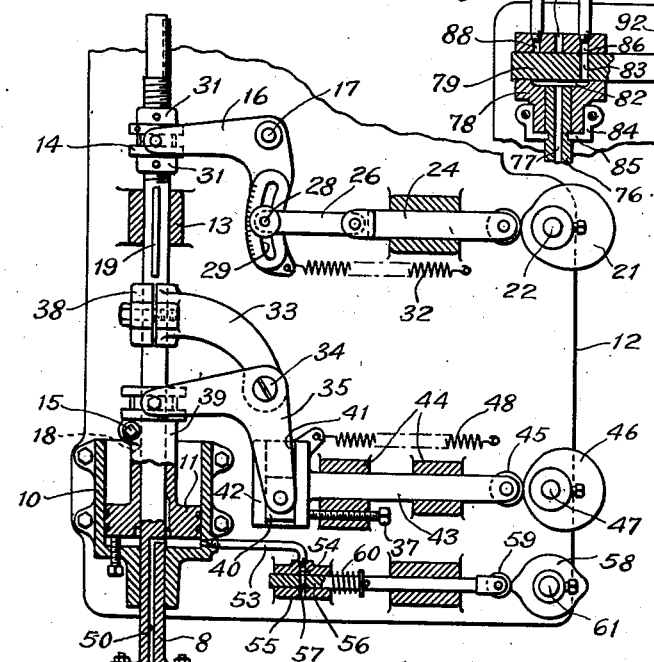
Inventor
Wm. H. Honiss
by Brown & Parham
Attorneys.

Patented Apr. 13, 1937

2,077,148

UNITED STATES PATENT OFFICE 2,077,148

GLASS FEEDING METHOD AND APPARATUS

William H. Honiss, West Hartford, Conn., assignor to Hartford-Empire Company, Hartford, Conn., a corporation of Delaware Application September 17, 1932, Serial No. 633,619

29 Claims. (Cl. 49—55)

This invention relates generally to the automatic feeding of molten glass from a supply body and converting it into successive separate measured charges of weights, shapes and viscous or plastic condition suitable for further and immediate conversion into various forms of glassware.

The invention relates more particularly to methods and apparatus in which the glass is flowed from the supply body to a submerged pump chamber through a flow passage between the upper end portion of the pump chamber and the lower end portion of an air bell or hollow implement through which a superatmospheric pressure is applied to the glass in the pump chamber periodically to forcibly discharge successive charges of glass therefrom, and lesser or subatmospheric pressure is applied in the intervals between such periods of application of the higher pressure to retract or retard downward movement of the stub of glass left after the severance of the feeding charge and to replenish the pump chamber with new glass.

Each charge consists of two components, i. e., the stub and other residual glass left in the chamber after the discharge and severance of the previous charge, and a portion of the new glass sufficient to make up the required charge weight. As the charges are discharged from the chamber, they preferably remain suspended from the outlet until they become full size and attain the shape desired, and they then are severed for delivery to molds of associated glassware fabricating mechanism.

In the feeders of the type above referred to, it is usual to provide a continuously open inflow passage from the supply body to the pump chamber. This permits some regurgitation or backflow of glass from the chamber during the application of the higher or superatmospheric pressure to the glass in the pump chamber, as such pressure obviously forces glass upwardly as well as downwardly. To restrain or minimize such backflow, reliance heretofore has been placed upon the effects of gravitation or hydrostatic head of the supply body which aid inflow but oppose backflow. Variations in the hydrostatic head or in the viscosity of the glass would affect the volume of both the inflow and backflow, and adjustments of the air bell or pressure applying implement to compensate for results in variation of the downflow would proportionately vary the backflow. Such backflow would cause a proportionate reduction of volume of the glass in the chamber and a dissipation of the superatmospheric pressure. Should the air bell or pressure applying member be reciprocated, such loss of volume might be corrected by adjustments to lengthen the stroke of the reciprocating member, but this, however, would not lessen the dissipation of the glass discharging or superatmospheric pressure.

In the present invention, regurgitation and the consequent dissipation of the glass discharging or superatmospheric pressure and loss of volume are wholly prevented or rendered negligible by a control of the flow passage, so as to prevent any appreciable backflow during the application of the superatmospheric pressure and during the downstroke of the air bell, when the latter is reciprocated, and if desired, for preventing inflow of new glass to the chamber during the initial part of the application of a lesser or subatmospheric pressure and during part of the upstroke of the air bell, when the latter is reciprocated.

Apparatus embodying the present invention thus constitutes a volumetric pump.

A general object of the present invention is to provide a more complete adaptation and coordinated control of the feeding operations, especially of the pumping action in the pump chamber, the measuring of the amounts or quantities of glass in the pump chamber after each glass discharging operation, the proportioning with respect to each other of the residue of glass therein and of the new glass drawn thereinto for the succeeding charge after the discharge of a preceding charge, and the shaping of the glass charges discharged from the outlet of the pump chamber and collected in suspension therebelow.

A more specific object of the invention is to periodically interrupt and restore the continuity of the column of glass flowing into the pump chamber so as to temporarily segregate the glass therein from the supply body and prevent or reduce to a negligible minimum leakage and consequent loss of glass volume and dissipation of pressure by backflow of glass from the pump chamber during the forcible discharge of each charge therefrom, whereby more accurately to determine and uniformly maintain the weight and shape of whatever size or form of mold charge is being made.

Other objects are to determine and uniformly maintain the proportions of the residual and new glass composing each charge and to insure the prompt and regular discharge of the residual glass to maintain the weight and homogeneity of the succeeding charges. Also, to regulate the time and extent of retracting or holding back the residual glass in the pump chamber relative to the time and volume of inflow of new glass to the chamber to complete the next charge. Also, to allow the use of a shallower supply body of glass. Also to improve "multi-weight" feeding, i. e., feeding repeated series of charges of different weights and/or shapes in cyclic order by the same feeder, all independently of changing viscosity, and/or hydrostatic head.

These and further objects, novel features and advantages of the invention will be apparent from the following description and from the accompanying drawing.

The broad or basic principles of the invention may be applied in different ways and by different apparatus. Other specific embodiments of those basic principles are disclosed in the related patent applications, Serial Nos. 633,617 and 633,618, filed concurrently herewith.

Figure 1 is an elevation, partly in section, showing a glass feeder embodying the present invention;

Figs. 2, 3 and 4 are fragmentary sectional elevations, which with Fig. 1 illustrate a complete cycle of the operation of feeding and shaping a tapering mold charge largest at its upper end, known as a "plumb bob" charge;

Fig. 5 is an enlarged view similar to Fig. 2 showing diagrammatically by white areas the annular space in which the upward movement of the air bell tends to create a vacuum or void;

Fig. 6 is a sectional elevation of a modification showing geared connections for rotating the shaft and air bell while they are reciprocating;

Fig. 7 is a fragmentary elevation, partly in section, showing a modification of the mechanism for controlling the application of different pneumatic pressures to the cavity of the air bell;

Fig. 8 is an elevation of a cam which may be substituted for the valve operating cam of Fig. 7;

Fig. 9 is a sectional elevation of a modified form of air bell; and

Fig. 10 is an elevation, partly in section, showing a modified form of air bell and pump chamber, in which the bell is rotated to open and close inlet ports of the chamber.

As shown in above drawing, Figs. 1 to 5 inclusive, a reciprocating bell shaped plunger 1 extends into a supply body of molten glass 2 in a forehearth or container 3, which may be of any suitable form and construction and may be supplied with molten glass in any suitable known manner, usually by attachment to a glass melting tank. A well-shaped pump chamber 4 in the bottom of the forehearth, and submerged by the glass therein, terminates at its lower end in a discharge outlet 5.

The bell-plunger is mounted in axial alignment with the pump chamber, and may telescope within the well during part of the reciprocatory movements thereof, as shown in Figs. 1 and 4, or it may telescope outside of a curblike upward extension of the cylindrical wall of the pump chamber. A sufficient clearance space should be left between any such telescoping surfaces to admit a lubricating and packing film of glass between them, part of which adheres to the bell and the other part adheres to the wall of the chamber, without allowing an appreciable volume of flow of free glass therethrough.

The size, capacity and configuration of the pump chamber and its discharge outlet may be varied in any suitable known manner, as by the substitution of removable and replaceable outlet spouts or rings, as now is well known in the art.

Shear blades 6, operated in any suitable known way, may be used to sever the mold charges as they are delivered from the outlet.

The air bell 1 has a stem 7 which extends above the glass and is removably coupled with a vertically reciprocating shaft 8, so that a bell of different shape and/or capacity may be readily substituted therefor. The rod 8 extends through the air cylinder 10 and through a piston 11 therein. The cylinder 10 serves as a stationary guide and bearing for the shaft 8 and is attached to a frame 12.

Above the cylinder 10, the shaft 8 may extend through an additional bearing guide 13 on the frame 12. A spline 19, to keep the shaft from rotating, may be removed when the shaft is to be rotated, as by the gearing of Fig. 6. For reciprocating the shaft and its bell 1, and sometimes the piston 11, and adjusting them vertically, a collar 14 is threaded on the shaft and is pivotally connected with an angle lever 16, fulcrumed at 17 on the frame. The lever is operated by a cam 21 on shaft 22 through a slide 24 and link 26, which is connected with a pivot stud 28 slidably clamped in an arcuate slot 29 in the lower arm of the angle lever. The stroke of the angle lever 16 may be varied by adjusting the pivot 28 along the slot 29 to positions indicated by a graduated scale on the lever, to vary the extent of the reciprocation of the air bell 1 without changing the limit of its downward movement with respect to the outlet. That lower limit may be adjusted by screwing the threaded collar up or down on the shaft 8, and clamping it in adjusted position by the check nuts 31. From this lower limit the extent of reciprocation of the bell may be varied by adjusting the pivot stud 28 along the slot 29 as above described. The weight of the shaft and its appurtenances will usually be sufficient to hold the roller on the slide 24 against the cam 21. Otherwise, a spring 32 may connect the angle lever 16 with the frame for that purpose.

Provision preferably is made for periodically relieving the subatmospheric and superatmospheric pressures within the air bell 1 at or near the top and bottom respectively of each stroke. Thus a space, indicated at 9, may be maintained continuously beneath the piston in the lower part of the cylinder 10. An air passage 50 from the interior of the air bell extends through its stem 7 and the shaft 8, and communicates with the clearance space 9, from which an air tube 53 connects with a passage 54 in a valve casing 55. A reciprocating valve 56 in the valve casing has a transverse passage 57 which is aligned with the passage 54 at one position of the valve stroke, and closes that passage at other positions.

The valve 56 is reciprocated by a cam 58, engaging with a roll 59 on the valve stem. A spring 60 between a stop on the valve and the adjacent end of the valve casing, holds the cam roll continuously against its cam. The cam 58 is rotated by a shaft 61 driven in synchronism or suitably timed relation with the shaft 22.

The shape of the cam 58 provides for moving the passage 57 of valve 56 twice into register with passage 54, as in Fig. 1 for each complete stroke of the bell 1, once at or near the bottom of its stroke to release superatmospheric pressure from the bell space 9, and again when the bell has reached the top of its stroke or as it descends to the position of Fig. 3, to restore atmospheric pressure in the space 9. At all other times the passage 54 is closed, so that partial vacuum will be created in the space 9 during the upstroke of the bell, and for some purposes hereinafter described during part of its downstroke, and so that superatmospheric pressure may be produced in that space during all or the latter part of the downstroke of the bell. Such vacuum in the air space 9 or well, whether complate or partial, will induce and allow differential atmospheric pressure on the outside surfaces of the glass to force glass into and satisfy the vacuum, as more fully described later herein.

For feeding many types of mold charges, especially those of relatively small weights and simple shapes, the mechanism thus far described will be found sufficient. For the feeding of larger weights and/or more difficult shapes, the supplemental mechanism now to be described may be used to advantage. A primary advantage is that it may be installed and remain in position for immediate use at any time, and be quickly and easily put into and out of operation. It consists of an air cylinder and piston, preferably compactly mounted concentrically with the shaft 8, so that it may be operated in either of two ways. The piston may be clamped to the shaft and reciprocated therewith. Or if the degree of pressure and vacuum thus produced in the air space 9 of the bell is not high enough the piston may be unclamped from the shaft and operated by a cam independently of the shaft and in a cycle of movement which may differ from that of the shaft and its air bell 1. Or it may remain unclamped, stationary and out of operation. When in operation in either of the ways described, the pneumatic effects of the movements of the piston in the cylinder 10 operate through the air passage 50 to augment and under some circumstances to modify the pneumatic and dynamic effects of the reciprocating movements of the bell.

The piston 11 may be clamped to the shaft 8 by slotting one of its walls lengthwise as at 18 and clamping it by a screw 15. By removing either the angle lever 35 or the cam 46, the piston will be free to move up and down with the shaft and thus augment the pneumatic effect of the bell movements still employing the relief valve 56. Or by leaving the piston loose on the shaft 8, it may be operated by the cam 46 on shaft 47 through the angle lever 35, pivoted at 34 on the bracket 33 clamped on the shaft by the cap 38. The other arm of the lever is pivotally connected with a pivot block 40 sliding vertically in a slideway 41 in the head 42 of the slide bar 43, the opposite end of which engages by a cam roll with the cam 46, the roll being held in contact with the cam by a spring 48. The cam 46 is shaped so as to move the piston 11 up and down in the cylinder 10 in such time relations to the movements of the bell as to augment or modify the pneumatic and dynamic effects of the bell movements. The time and extent of augmentation of compression and rarefaction of air in the air bell space 9 may be thus regulated in co-ordination with the vertical movements of the bell, and the air within the space 9 may be compressed and rarefied to greater or different degrees than if the piston 11 moved only with the shaft 8.

A screw 37, carried by one of the bearings 44 for the slide bar 43, may be adjusted to bear against the head 42 to hold the cam roll 45 off the cam when desired or to limit the outward sliding movement of the bar 43 for any useful purpose. This adjustment may be used to advantage when it is desired to remove or adjust the cam 46 while the piston 11 is free to slide on the shaft 8.

The lower limit of the movement of the piston 11 in the cylinder 10 for a given reciprocation of the shaft 8 may be predetermined and regulated by vertical adjustment of the piston on the shaft 8 before the screw 15 is tightened to secure the piston to the shaft.

The cams may all be adjusted angularly about their shafts to adjust the time phase relations between the parts which such cams control. Also, cams of different configurations may be substituted for those cams, to produce different effects desired.

In general, a typical operation of the mechanism which has just been described in detail may be substantially as follows:

The downstroke of the air bell in the glass will compress the air in the cavity 9 of the bell, due to the viscosity and consequent sluggish movement of the glass. The upward movement of the bell will rarefy the air therein for the same reason. Such compression and rarefaction may be increased, if required, by the coordinated supplemental pneumatic action of the piston 11, either reciprocated in the cylinder 10 by the shaft 8 and/or the cam actuated angle lever 35. At each end of the strokes of the air bell, or at other times determined by the shape and setting of the cam 58, the relief passage 54 may be opened to restore normal atmospheric pressure in the air bell space 9, releasing the superatmospheric pressure caused by the downstroke of the air bell, and satisfying the vacuum created by its upstroke, whether or not supplemented by the use of the piston 11 in either case.

These purely pneumatic effects of the movements of the air bell are augmented by the displacement effects of its movements. The mere upward movement of the air bell tends to create a complete vacuum in the annular space 62 vacated within the enclosing glass by the rim of the bell, Fig. 5, which movement by itself alone induces differential atmospheric pressure against the outside of the glass, indicated in Fig. 5 by arrows at the outlet and on the surface of the glass, throughout that rising movement. The rising movement also rarefies the air in the space 9, and that rarefaction may be increased by use of the reciprocating piston 11 in either of the ways above described. Such rarefaction by the resultant differential atmospheric pressure tends to raise the glass within the bell, thus increasing its volume to suit the size of the charges then being fed.

In Fig. 1 the air bell has started on its upward movement. The shears 6 have just closed to sever a mold charge 63, and the differential pressure at the outlet is lifting the severed stub away from the shears to minimize the heating and chilling of the stub.

As a result of these differential pressure conditions, the stub of glass remaining after the severance of the previous mold charge 63 and other residual glass in the pump chamber 4 and air bell 1 will be pushed upward as the air bell rises. The residual stub of glass may be retracted entirely within the outlet, substantially as indicated at 64 (Figs. 2 and 5). Then a quota of new glass from the supply body in the forehearth will be forced into the chamber and air bell substantially as indicated at 65 (Fig. 2), completing the desired volume when the air bell reaches the top of its stroke.

The upward movement of the stub and residual glass in the air bell by the differential pressure at the outlet, while the inlet passage from the supply body remains closed, as in Fig. 1, will continue until the rim of the air bell moves above the upper end of the well and thus opens the inlet passage 52. Thereafter, until the bell reaches the top of its stroke (Fig. 2), new glass will be forced in through the inlet passage by the differential pressure on the surface of the supply body and unite with the residual glass, being compressed between the pressures from below and above. The cavity of the bell and the pump chamber should have a joint capacity greater in volume than that of any mold charge to be fed.

When the air bell reaches the top of its stroke, which may be at the position shown in Fig. 2, the required volume of glass is in the pump chamber and bell, and the differential effects may cease and the glass may be allowed to flow from the outlet under gravity and head pressure to about the extent shown in Fig. 3.

A vacuum relief valve (not shown), which may be of any suitable known construction, such, for example, as the relief valve 61 of Fig. 4 of U. S. Patent No. 1,662,437, may be pneumatically connected with the interior of the air bell so as to limit the range of vacuum therein, particularly for the purpose of obviating the possibility that glass may rise too high in the bell perhaps high enough to obstruct the air duct 50.

The downward movement of the bell may be made to gradually accelerate the gravity discharge of glass from the outlet, both by mechanical or dynamic displacement, and by superatmospheric pressure on the glass in the bell space 9, resulting from the compression of air within the space 9 as the air bell moves downward, augmented whenever necessary or desired by the pneumatic effects of the downward movement of the piston 11 in the cylinder 10. These downward movements may be varied and regulated to produce charge shaping effects varying within a wide range. Usually the first part of the downstroke of the bell is relatively slow to allow the leading portion of the charge to flow out by gravity only, as in Fig. 3. Such slight inflow from the supply body while the inlet 52 is being closed by the rim of the bell can be allowed for by shortening the upstroke of the plunger, or prevented by increasing the pressure in the space 62 by use of the piston 11, sufficiently to prevent inflow without causing backflow and consequent loss of volume which is one of the objects of this invention. The hydraulic head of glass in the supply body will in many cases be sufficient to balance the tendency of the initial slow downward movement of the bell to cause such backflow.

After closing the inlet, as in Fig. 3, the further downward movement of the bell is adapted and confined to the shaping of the body and upper portion of the mold charge, progressively accelerating the rate of discharge to compensate for the increasing stretching and consequent tendency toward attenuation of the already extruded glass, due to its increasing weight, thereby progressively expanding the diameter of the charge at successive portions of its length by forcing or "stuffing" more into the retreating end of the previously discharged and slower falling portion.

As the glass emerges from the outlet, it is encased in a thin membranous sack-like skin, due in part to its exposure to the relatively cold outside air. That skin assists in supporting the discharging charge in suspension from the outlet until it reaches the required volume. Being flexible and stretchable the skin may be expanded or contracted locally by the varying rate of discharge due to variations in the rapidity of the downstroke of the bell or to variations in the accompanying pneumatic pressure, or both.

By the selective use of cams of suitable contours and/or the selective use of adjustments of the mechanism of this improved feeder, or by combinations of such adjustments, mold charges or other charges of a wide range of weights, shapes and proportions may be accurately made at a rapid rate. In respect of its accurate measurement of the different glass volumes, it constitutes a volumetric pump.

If it is desired to rotate the air bell in the glass to mix and make the latter more uniform in temperature and viscosity, or for any other purpose, the modification shown in Fig. 6 may be applied to the shaft 8. As shown therein, the driven gear 70 may be keyed to the upper end portion of the shaft 8 and the driving gear 71 may be rotatably supported in mesh therewith, by means of a drive shaft 72 journaled in a bearing 73 on the frame 12. In such modification the bracket 33 may be detached from the shaft 8 and angle lever 35 of the Fig. 1 construction, and a suitable pivot stud, not shown, substituted for the pivot stud 34 and secured to the frame 12 so as to serve as a stationary pivot stud for the angle lever. The piston 11 should be unclamped from the shaft 8 to allow the shaft 8 to rotate freely, leaving the piston free to be reciprocated on the shaft by its cam 46, or by a substitute cam having greater throw, to compensate if necessary for the movement lost by detachment from the shaft 8. The shaft 8 and its supported air bell then may be rotated without interference with the reciprocatory movements of these parts, the gear 70 being of sufficient length to remain engaged with the gear 71 during the reciprocation of the air bell.

A further modification is shown in Fig. 7, which may be applied where an outside or central source or system of subatmospheric and superatmospheric pressure is available and is desired, instead of the self-contained pneumatic system shown in Fig. 1, comprising the cylinder 10, piston 11, relief valve 56 and their air connections with the duct 50.

In that modification, as shown, the shaft 8 is replaced by a substantially similar shaft 76 having an air duct 77 the entire length thereof and connecting through a valve casing 78 and valve 79 with pipes 80 and 81, respectively connected with said sources of superatmospheric and subatmospheric pressures. As shown in Fig. 7 the upper end of the shaft 76 extends into and may rotate within its bearing in the bottom portion of the valve casing 78, with the air duct 77 in continuous communication with the chamber or air passage 82 of the valve casing 78. The valve casing 78 is held in endwise relation to the shaft 76 by a split collar 84 which is clamped to the valve casing in any suitable way, and has a circumferential flange 85 extending into a circumferential groove in the shaft, so that the valve casing will be moved vertically with the shaft 76, while the latter may be rotated if desired, as where the mechanism shown in Fig. 6 is employed.

The valve 79 slides in its casing 78 and has a vertical air passage 83, the lower end of which continuously communicates with the chamber 82.

Its upper end can be moved into register with any of the ports 86, 87, and 88, connecting respectively with the super-pressure pipe 80, the atmosphere, and the subpressure pipe 81.

The sliding valve 79 is moved by the cam 90 on the shaft 89 through sliding connections as follows: A block or flange 91, or a roll on the projecting end of the valve 79, slides in a vertical slideway 92 in the crosshead 93 of a slide bar 94, which engages with the cam through a cam roll 95, and is held in engagement by a spring 96.

In Fig. 7 the valve passage 83 is in position to register the air bell space 9 with the pipe 80, admitting superatmospheric pressure to that space during the downstroke of the bell. At about the bottom of that stroke the passage 83 will be moved by the cam 90 into register with the relief port 87 to restore normal atmospheric pressure in the space 9. The passage 83 is moved into register with the port 88 and pipe 81, whereby air is exhausted more or less from the space 9 before the bell makes its upward stroke, at the end of which the passage 83 is moved out of register with the port 88 and into register with the relief port 87, whereby normal atmospheric pressure is again restored in the space 9. Then the passage 83 is moved again to the position shown in Fig. 7.

The cam 90 is suitably shaped and driven to cause these applications of superatmospheric and subatmospheric pressures and the intermediate release of such pressures to act in conjunction with the movements of the air bell to effect charge collecting and charge shaping effects, which may be varied as desired according to various conditions of service for different sizes and shapes of charges.

When the shaft 76 is thus substitued for the rod 8 in Fig. 1 and used with the valved pressure control mechanism of Fig. 7, it will have some means, which may be that shown in Fig. 1, for reciprocating the shaft vertically. The bracket 33 should be removed. The piston 11 and/or its operating mechanism of Fig. 1 may be removed or may remain in place if the clamp 15 is loosened enough to allow the shaft 76 to slide freely through the piston.

If during the use of modification shown in Fig. 7, it is found sufficient to compress and rarefy the air in the space 9 of the air bell by the action of the reciprocating air bell alone, a cam 98, such as shown in Fig. 8, may be substituted for the cam 90 of Fig. 7 and adapted to move the passage 83 only into and out of register with the relief port 87, thus operating like cam 58 and its valve 56 of Fig. 1.

The volume capacity of the air bell cavity may be varied according to different conditions of service at different times. In Fig. 9 a modified form of air bell 99 has its cavity divided by vertical partition walls 100, which may extend in conical form approximating the contour of the bottom of the pump chamber. These partitions increase the stirring effects of the bell when rotated by the mechanism of Fig. 6, above described. During the rising movements of the bell, with or without rotating, these partition walls also increase the volume of displacement, as compared with the displacement volume indicated by white areas in Fig. 5.

In order to close the inlet promptly while the bell is at the top of its stroke, so that it may start down rapidly without causing backflow through the inlet as might be caused in moving to the position of the bell 1 shown in Fig. 3, the bell may be constructed as shown in Fig. 10, in which the rim of the bell always remains telescoped below the top of the chamber wall, and the interlapping portions are provided with inlet ports which are opened and closed by turning the bell on its axis. When the ports begin to coincide, as during the upstroke of the bell, the new glass is forced in by the differential pressure above described. At the top of its stroke, before it begins to descend, the bell is turned far enough to close the ports, thus preventing any backflow of glass, however rapid the downstroke may be. The ports remain closed during the first part of the next upstroke of the bell, until the stub and other residual glass has been retracted at the outlet to the desired extent, and then are opened to let in the new glass. The telescoping portions are separated by a film of glass to prevent actual contact, as described in connection with Figs. 1 to 5.

The bell 101 is connected with either of the shafts 8 or 74 by a swivel coupling 102 which is made in halves for easy application or removal. These halves are clamped together by screws 103. They are clamped tightly on the shank of the bell and loosely enough on the shaft 8 to allow them to be turned with the bell by the arm 104. The arm may be connected in any convenient way, as by a link 105, to a cam or any other suitable device for turning the bell far enough to open and close the ports 106 of the bell, with relation to the ports 107 of the pump chamber 108.

This modification shown in Fig. 10 is not confined to feeders employing a reciprocating bell, but is applicable also to feeders of the types in which the bell does not move in an axial direction and acts upon the glass by pneumatic pressure derived from extraneous vacuum and/or pressure pumps.

The mechanisms for operating the air bell and for controlling the applications of sub-atmospheric and superatmospheric pressures thereto, if such pressures are used, may be modified so as to permit the feeding of mold charges of different weights and/or shapes in each of repeated series, known as "multi-weight" charges. For example, for feeding series of three different weights of charges, multi-lobed cams may be employed, each cam being geared to make one revolution for each series of three charges, and the lobes being differently shaped so as to produce, during each cycle of rotation of the cam, mold charge masses of three different weights and/or shapes, as desired. The operating mechanism for the shears then would be similarly modified and timed so as to sever a charge from each mold charge mass.

Other modifications of the constructions shown in the accompanying drawing may be resorted to without departing from the scope of the invention to which the appended claims are directed.

These claims are limited to species of invention of which examples are illustrated in the accompanying drawing, as distinguished from species of the disclosures of my related applications Serial Nos. 633,617 and 633,618, filed concurrently herewith. Such claims are not to be otherwise limited beyond the plain meaning of the terms thereof, read in the light of the disclosure herein and in view of the prior art.

I claim:

1. The method of feeding a measured charge of molten glass from a supply body thereof, which comprises forcing a column of glass from the supply body into a pump chamber, and temporarily segregating the glass in the chamber from the supply body while forcibly discharging through a separate outlet of the chamber a portion of the segregated glass to constitute the measured charge, by the action of a plunger operating as a piston in the glass in the chamber augmented by extrusive pneumatic pressure applied through the plunger to the glass in the chamber while that glass is segregated from the supply body.

2. The method of feeding a measured charge of molten glass from a supply body thereof, which comprises forcing a column of glass from the supply body into a pump chamber and temporarily segregating the glass in the chamber from the supply body while forcibly discharging through a separate outlet of the chamber a portion of the segregated glass to constitute the measured charge, in part by the dynamic action of a plunger operating as a piston in the glass in the chamber and in part by the application of varying pneumatic pressures applied to the glass in the chamber in predetermined time relationships with the movements of the plunger in the glass and while the latter is segregated from the supply body.

3. The method of feeding a measured charge of molten glass from a supply body which consists in collecting a volume of glass greater than the volume of the charge to be fed, by the application of sub-atmospheric pressure to glass in a chamber having a valveless outlet and a separate inlet passage from the supply body, segregating the collected glass from the supply body, and discharging a measured charge from the segregated glass through the outlet by the dynamic action of a plunger acting as a piston in the chamber augmented by super-atmospheric pressure applied through the plunger to the glass in the chamber while that glass is segregated from the supply body.

4. The method of feeding a measured charge of molten glass from a supply body which consists in collecting a volume of glass greater than the volume of the charge to be fed by retractive movement of a plunger reciprocating in a chamber having a valveless outlet and a separate inlet passage from the supply body, augmented by sub-atmospheric pressure applied through the plunger to the glass in the chamber, segregating the collected glass from the supply body, discharging a measured charge from the segregated glass through the outlet by extrusive movement of the plunger, augmented by super-atmospheric pressure applied through the plunger to the glass in the chamber while that glass is segregated from the supply body and retaining residual glass in the chamber in a position to seal the outlet during the next retractive movement of the plunger.

5. Glass feeding apparatus comprising a pump chamber submerged by the supply body and having a separate valveless outlet, a rotatable hollow ended implement fitting the upper portion of the chamber closely enough to prevent appreciable flow of glass between them, and constituting an impelling means and rotary valve therefor, said implement and its coacting upper portion of the chamber being provided with ports movable into and out of coincidence by rotary movements of said implement, means for applying sub-atmospheric pressure through said implement to the glass in the chamber, means for applying super-atmospheric pressure through the implement to the glass in the chamber, and means for rotating said implement to open the ports and permit inflow from the supply body into the upper portion of the pump chamber when said sub-atmospheric pressure is applied, and to close the ports to prevent appreciable backflow of glass from said upper portion of the chamber when the super-atmospheric pressure is applied, whereby the new glass enters the top of the chamber and on each extrusion therefrom forces the free residual glass to the bottom of the chamber and from the outlet in advance of the new glass.

6. Apparatus for feeding molten glass from a supply body, comprising a chamber submerged by the supply body, and having a separate valveless outlet, a rotary and reciprocating hollow ended implement serving the functions of a valve and impeller by having its hollow lower end portion fitting the upper portion of the chamber closely enough to prevent appreciable flow of glass between them, excepting that said implement and the adjacent end portion of the walls of said chamber are provided with ports movable into and out of coincidence by rotary movements of said hollow ended implement, means for reciprocating the implement to impart periodic retractive impulses and alternate extrusive impulses to the glass in the chamber, and means for turning said implement to open said ports to admit glass into said upper portion of the chamber during each retractive movement of the implement, and to close the ports against backflow of glass from the chamber during each extrusive movement of the implement, whereby the new glass enters the top of the chamber and on each extrusion therefrom forces the residual glass to the bottom of the chamber and from the outlet in advance of the new glass.

7. Glass feeding apparatus comprising a glass container having a submerged discharge outlet, an air bell reciprocating in the glass in the container, an air compressing and rarefying device, and means connecting said air bell and said air compressing and rarefying device for operating the latter in response to the reciprocatory movements of the air bell and for connecting said device operatively with the cavity of said air bell.

8. Glass feeding apparatus comprising a glass container having a submerged discharge outlet, an air bell reciproacting in the glass in the container, a piston connected to reciprocate with the air bell, a cylinder in which said piston reciprocates, and means pneumatically connecting the cylinder with the interior of said air bell.

9. Glass feeding apparatus comprising a glass container having a submerged discharge outlet, an air bell reciprocating in the glass in the container, a piston connected to reciprocate with the air bell, a cylinder in which said piston reciprocates, an air passage connecting the cylinder with the interior of said air bell, and valve means for relieving abnormal pressures in the cylinder and air bell at or near the ends of the strokes of the air bell.

10. Glass feeding apparatus comprising a glass container having a submerged discharge outlet, an air bell reciprocating in the glass in the container, a piston connected to reciprocate with the air bell, a cylinder in which said piston reciproates, an air passage connecting the cylinder with the interior of said air bell, and means for causing independent reciprocatory movements of the piston.

11. Glass feeding apparatus comprising a glass container having a submerged discharge outlet, an air bell, means for reciprocating the air bell vertically in the glass, said means including a vertically movable shaft supporting the air bell, an air cylinder through which said shaft extends, a piston reciprocable in said cylinder for compressing and rarefying air therein, said piston having a bore through which said shaft extends, an air passage connecting said cylinder with the interior of said air bell, valve means for retaining or releasing pressure within said cylinder and air bell, and means for connecting said piston with said shaft for reciprocation as a unit.

12. Glass feeding apparatus comprising a glass container having a submerged discharge outlet, an air bell, means for reciprocating the air bell vertically in the glass, said means including a vertically movable shaft supporting the air bell, an air cylinder through which said shaft extends, a piston reciprocable in said cylinder for compressing and rarefying air therein, said piston having a bore through which said shaft extends, an air passage connecting said cylinder with the interior of said air bell, valve means for retaining or releasing pressure within said cylinder and air bell, means for causing said piston to be moved vertically as said shaft moves and means for imparting additional reciprocatory movements to said piston.

13. Glass feeding apparatus comprising a glass container having a submerged discharge outlet, an air bell, means for reciprocating the air bell vertically in the glass, said means including a vertically movable shaft supporting the air bell, an air cylinder through which said shaft extends, a piston reciprocable in said cylinder for compressing and rarefying air therein, said piston having a bore through which said shaft extends, an air passage connecting said cylinder with the interior of said air bell, valve means for retaining or releasing pressure within said cylinder and air bell, and means for selectively connecting said piston with said shaft or with a separate operating means.

14. Glass feeding apparatus comprising a glass container having a submerged discharge outlet, an air bell reciprocable vertically in the glass, a valve movable vertically with said air bell and operatively connected with the interior of said bell, and valve operating means including a cam and a horizontally movable member adapted to operate said valve at any place along the path of vertical movement of said valve.

15. In glass feeding apparatus, a bell reciprocable in the glass and having its interior divided into a plurality of glass receiving compartments, each open at its lower end.

16. In glass feeding apparatus, a bell reciprocable in the glass and having its interior divided into a plurality of glass receiving compartments, each open at its lower end, and an air duct connected with each of said compartments.

17. In glass feeding apparatus, a chamber submerged by glass of a supply body and having an outlet at its lower end, an air bell reciprocating in the glass of the supply body, said air bell having its interior divided by substantially radial partitions into a plurality of glass receiving compartments, each open at its lower end, said partitions extending in conical form below the rim of the bell.

18. In glass feeding apparatus, a chamber submerged by glass of a supply body and having an outlet at its lower end, an air bell reciprocating in the glass of the supply body, said air bell having its interior divided by substantially radial partitions into a plurality of glass receiving compartments, each open at its lower end, said partitions extending below the rim of the bell, and means for rotating said bell, whereby the extending portions of said partitions will aid in stirring the glass in said chamber.

19. The method of feeding a pulsatory flow of molten glass from a supply body thereof through a chamber submerged in the glass, by reciprocating movements of an air bell, the rim of which is submerged in the glass and telescopes with the chamber wall, fitting that wall closely enough to prevent appreciable flow of glass between them, which consists in retracting the air bell from its telescoping relation to the chamber far enough to admit glass forced into the chamber from the supply body by differential atmospheric pressure on the supply body induced by the reduction of air pressure within the air bell due to its retractive movement, then telescoping the air bell relative to the chamber to prevent appreciable backflow of glass therefrom, while forcibly extruding the glass from a chamber outlet by compression of air within the bell due to its closing telescoping movement.

20. Apparatus for feeding molten glass from a supply body thereof, comprising a pump chamber submerged by the supply body, a reciprocating plunger having a hollow lower end movable into and out of telescoping relation to the chamber, in which relation their overlapping surfaces fit each other closely enough to prevent appreciable flow of glass between them, means for moving the plunger into and out of said telescoping relation, and means for applying sub-atmospheric and superatmospheric pressures within the hollow end of the plunger in predetermined time relation with its said movements and while said surfaces overlap and prevent backflow.

21. Apparatus for feeding molten glass from a supply body thereof, comprising a pump chamber submerged by the supply body, a plunger reciprocating in the chamber and thus serving as a piston and valve therein, the plunger also having an air cavity in its lower end communicating with the external atmosphere through a valved air passage, and the lower end of the plunger being movable into and out of telescoping relation to the chamber, in which relation their overlapping surfaces fit each other closely enough to prevent appreciable flow of glass between them, means for reciprocating the plunger into and out of the telescoping relation, and means for opening and closing the valved air passage in timed relation to the telescoping and valving movements of the plunger, whereby the plunger acts dynamically and pneumatically in conjunction with the chamber and also as a valve to periodically admit quotas of glass from the supply body to the chamber and to discharge charges therefrom while preventing appreciable backflow of glass from the chamber.

22. Glass feeding apparatus comprising a glass container having a submerged pump chamber, an air bell reciprocating into and out of telescoping relation to the chamber, in which relation they fit each other closely enough to prevent appreciable flow of glass between them, means for reciprocating the bell whereby the air in the bell is alternately compressed and rarefied, and supplemental pneumatic means operated by the reciprocating movements for alternately increasing the compression and rarefaction of air in the bell.

23. Glass feeding apparatus comprising a glass container having a submerged pump chamber, an air bell reciprocating into and out of telescoping relation to the chamber in which relation they fit closely enough together to prevent appreciable flow of glass between them, means for reciprocating the bell whereby the air therein is alternately compressed and rarefied, supplemental pneumatic means operated by the reciprocating movements for alternately increasing the compression and rarefaction of air in the bell, and means for varying the amplitude of reciprocation of the bell to vary the weight of the glass fed.

24. Glass feeding apparatus comprising a glass container having a submerged pump chamber, an air bell reciprocating into and out of telescoping relation to the chamber in which relation they fit closely enough together to prevent appreciable flow of glass between them, means for reciprocating the bell whereby the air therein is alternately compressed and rarefied, supplemental pneumatic means operated by the reciprocating movements for alternately increasing the compression and rarefaction of air in the bell, means for varying the amplitude of reciprocation of the bell to vary the weight of the glass fed, and means for varying the length of the telescoping overlap to vary the extent to which the residual glass is drawn back in the chamber relative to the volume of new glass admitted thereto.

25. Glass feeding apparatus comprising a chamber submerged by the supply body and having a separate valveless outlet, a rotatable hollow ended implement fitting the upper portion of the chamber closely enough to prevent appreciable flow of glass between them, and constituting a rotary valve therefor, said implement and its coacting upper portion of the chamber being provided with ports movable into and out of coincidence by rotary movements of said implement, means for periodically applying super-atmospheric pressure through the implement to the glass in the chamber, and means for rotating said implement to open the ports and permit inflow from the supply body into the upper portion of the chamber when no super-atmospheric pressure is being applied and to close the ports to prevent appreciable backflow of glass from said upper portion of the chamber when the super-atmospheric pressure is applied, whereby the new glass enters the top of the chamber and on each extrusion therefrom forces the free residual glass to the bottom of the chamber and from the outlet in advance of the new glass.

26. A method of forming separate mold charges of molten glass, which consists in maintaining a body of glass above a glass submerged flow orifice, segregating a portion of such glass from such body while maintaining such portion in communication with said orifice, and subjecting it to a flow impelling force, then in establishing substantially free communication between said orifice and such body while drawing glass from such body to augment the head of glass above such orifice, and in severing the issuing stream of glass below such orifice while the flow thereof is checked.

27. A method of forming separate mold charges of molten glass, which consists in maintaining a body of molten glass above a submerged flow orifice, alternately segregating the portion of such body above said orifice from such body while subjecting such portion to a flow impelling pressure, and establishing substantially free communication between said orifice and such body while drawing glass therefrom to augment the head of glass above said orifice and while checking the flow through such orifice and in then severing the stream of glass depending from said orifice.

28. A method of controlling the flow of molten glass or the like through a submerged orifice and from a body maintained above such orifice, which consists in augmenting the head of glass above the orifice by the application of a vacuum to a segregated portion of the surface thereof and while maintaining substantially free communication between such body and said orifice and then in substantially segregating glass above such orifice from such body while subjecting such segregated portion to a flow impelling pressure.

29. The method of feeding molten glass from a supply body in a container having a submerged well terminating at its lower end in a continuously open outlet and having an air bell depending into the glass of the supply body in substantially axial alignment with said outlet, comprising the steps of operating said air bell so that the bell is effective in conjunction with the walls of said well periodically to define a glass flow passage through which glass from the supply body passes to the upper part of the well and the adjacent part of the interior of the air bell, and periodically to cut off completely glass flow communication between the supply body and the well and interior of the air bell, applying superatmospheric pressure to the glass in the air bell and well while glass flow communication with the supply body is thus cut off to accelerate discharge from the outlet of the well to aid in controlling the formation and shape of an accumulating mold charge mass of glass in suspension from the outlet, and cutting off a mold charge from the suspended mold charge mass when it has attained the desired size and shape.

WILLIAM H. HONISS.